(12) United States Patent
Zou et al.

(10) Patent No.: US 12,725,861 B2
(45) Date of Patent: Sep. 1, 2026

(54) BATTERY CELL, BATTERY, ELECTRICAL APPARATUS, AND METHOD AND DEVICE FOR PREPARING BATTERY CELL

(71) Applicant: CONTEMPORARY AMPEREX TECHNOLOGY (HONG KONG) LIMITED, Hong Kong (CN)

(72) Inventors: Qifan Zou, Ningde City (CN); Peng Wang, Ningde City (CN); Feng Qin, Ningde City (CN); Xin Chen, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 572 days.

(21) Appl. No.: 18/328,752

(22) Filed: Jun. 4, 2023

(65) Prior Publication Data

US 2023/0307750 A1 Sep. 28, 2023

Related U.S. Application Data

(63) Continuation of application No. PCT/CN2021/118623, filed on Sep. 15, 2021.

(51) Int. Cl.
*H01M 50/184* (2021.01)
*H01M 10/04* (2006.01)
(Continued)

(52) U.S. Cl.
CPC ..... *H01M 50/184* (2021.01); *H01M 10/0404* (2013.01); *H01M 10/049* (2013.01);
(Continued)

(58) Field of Classification Search
CPC ............. H01M 50/184; H01M 50/107; H01M 50/152; H01M 50/186; H01M 10/04; H01M 10/0404; H01M 10/049
(Continued)

(56) References Cited

FOREIGN PATENT DOCUMENTS

| | | | |
|---|---|---|---|
| CN | 103151475 | A | 6/2013 |
| CN | 103199204 | A | 7/2013 |

(Continued)

OTHER PUBLICATIONS

Machine translation of CN 108807734 A (Year: 2018).*
(Continued)

*Primary Examiner* — Kevin P Kerns
(74) *Attorney, Agent, or Firm* — K&L Gates LLP

(57) ABSTRACT

A battery cell, a battery, an electrical apparatus, and a method and a device for preparing a battery cell are provided. In some embodiments, the battery cell includes: an electrode assembly; a case for accommodating the electrode assembly, wherein the case has an opening and a first position-limiting portion; an end cover for covering the opening, wherein in the thickness direction of the end cover, the end cover is located on one side of the first position-limiting portion facing the electrode assembly, and the first position-limiting portion is used for restricting the movement of the end cover in a direction away from the electrode assembly; and a sealing member for sealing the end cover and the first position-limiting portion, so that the end cover and the first position-limiting portion are in sealed connection.

19 Claims, 7 Drawing Sheets

(51) Int. Cl.
*H01M 50/107* (2021.01)
*H01M 50/152* (2021.01)
*H01M 50/186* (2021.01)

(52) U.S. Cl.
CPC ....... *H01M 50/107* (2021.01); *H01M 50/152* (2021.01); *H01M 50/186* (2021.01)

(58) Field of Classification Search
USPC .......................................................... 429/174
See application file for complete search history.

(56) References Cited

FOREIGN PATENT DOCUMENTS

| | | | | |
|---|---|---|---|---|
| CN | 103283055 A | | 9/2013 | |
| CN | 206353550 U | | 7/2017 | |
| CN | 108807734 A | * | 11/2018 | .......... H01M 50/183 |
| JP | H0177260 U | | 5/1989 | |
| JP | 2000082457 A | | 3/2000 | |
| JP | 2000208113 A | | 7/2000 | |
| JP | 2012234716 A | | 11/2012 | |
| WO | 2020137777 A1 | | 7/2020 | |

OTHER PUBLICATIONS

Decision to Grant a Patent received in the counterpart Japanese application 2023-505886, mailed on Oct. 28, 2024.
The first office action received in the corresponding Japanese Application 2023-505886, mailed Mar. 4, 2024.
International Search Report received in the corresponding International Application PCT/CN2021/118623, mailed Mar. 29, 2022.
The extended European Search Report received in the counterpart European Application 21951112.8, mailed on May 17, 2024.

* cited by examiner

BATTERY CELL, BATTERY, ELECTRICAL APPARATUS, AND METHOD AND DEVICE FOR PREPARING BATTERY CELL

CROSS REFERENCE TO RELATED APPLICATIONS

The present application is a continuation of International Application PCT/CN2021/118623, filed on Sep. 15, 2021 and entitled "BATTERY CELL, BATTERY, ELECTRICAL APPARATUS, AND METHOD AND DEVICE FOR PREPARING BATTERY CELL", the entire disclosure of which is incorporated herein by reference.

TECHNICAL FIELD

The present application relates to the technical field of energy storage devices, and in particular to a battery cell, a battery, an electrical apparatus, and a method and a device for preparing a battery cell.

BACKGROUND ART

Energy saving and emission reduction is the key to the sustainable development of automobile industry. In such cases, electric vehicles have become an important part of the sustainable development of the automobile industry due to their advantages of energy saving and environmental friendliness. For electric vehicles, battery technology is an important factor related to their development. It is of great importance to maintain battery cells sealed to improve the safety and reliability of batteries.

SUMMARY OF THE INVENTION

In order to address the above-mentioned problems, the present application provides a battery cell, a battery, an electrical apparatus, and a method and a device for preparing a battery cell, which can enhance the sealability of the battery cell and improve the safety and reliability of the battery.

A first aspect of embodiments of the present application provides a battery cell comprising: an electrode assembly; a case for accommodating the electrode assembly, wherein the case has an opening and a first position-limiting portion; an end cover for covering the opening, wherein in the thickness direction of the end cover, the end cover is located on one side of the first position-limiting portion facing the electrode assembly, and the first position-limiting portion is used for restricting the movement of the end cover in a direction away from the electrode assembly; and a sealing member for sealing the end cover and the first position-limiting portion, so that the end cover and the first position-limiting portion are in sealed connection; wherein the end cover comprises a cover body and a protrusion protruding from the surface of the cover body facing away from the electrode assembly in the thickness direction of the end cover, and at least part of the sealing member is clamped between the protrusion and the first position-limiting portion.

The protrusion is provided on the surface of the end cover facing away from the electrode assembly, and after an opening of the case is covered with the end cover, at least part of the sealing member is clamped between the protrusion and the first position-limiting portion, so that the first position-limiting portion and the protrusion clamp the sealing member to ensure the sealability of the battery cell.

In some embodiments, the first position-limiting portion is a flanging structure formed on the surface side of the end cover facing away from the electrode assembly by partially folding the case towards the end cover.

With the flanging structure, the folded portion of the sealing member clads the protrusion, and the flanging structure of the first position-limiting portion clads the sealing member, so that the first position-limiting portion and the protrusion can clamp and jointly press against the sealing member, thereby improving the sealability of the battery cell.

In some embodiments, the first position-limiting portion comprises a first portion and a second portion which are connected, the first portion clads the protrusion, and the second portion extends a first predetermined distance from an end of the first portion near the center of the end cover towards the center of the end cover.

The first portion completely clads the protrusion, and the second portion extends the first predetermined distance towards the center of the end cover, so that the sealability of the battery cell is better, and the width of the second portion is the first predetermined distance, so that a bus member can be connected to the second portion, thus realizing the electric connection of multiple battery cells.

In some embodiments, in the unfolded state of the first position-limiting portion, the second portion comprises a plurality of notches spaced around a central axis of the case, and each notch extends to an end of the second portion away from the first portion.

The plurality of notches are spaced, so that the second portion is divided into a plurality of folded portions spaced around the central axis of the case, wherein after the first position-limiting portion is folded in a direction towards the end cover, and the first portion clads the protrusion, the plurality of spaced folded portions extend in the direction towards the center of the end cover, respectively, thereby avoiding the formation of wrinkles in the second portion during folding and smoothing. In addition, due to the provision of the plurality of notches, the first predetermined distance that the plurality of folded portions extend in the direction towards the center of the end cover can be set wider, and when the bus member is connected to the second portion by welding, the area of welding zone is increased, and the over-current area is increased.

In some embodiments, the notch comprises two tangential edges intersecting at a vertex and forming a predetermined angle, and after the first position-limiting portion is folded towards the end cover, the two tangential edges leading from the vertex are butted, so that the second portion forms a complete annular structure.

The second portion is made to cover the upper surface of the end cover to form a complete annular structure which, due to the absence of wrinkles, does not create a false welding when the bus member is welded to the second portion, thus ensuring weld strength. Also, there is no gap formed after the second portion is folded to the upper surface of the end cover due to the presence of the notch, and the area of welding zone is not affected.

In some embodiments, the case is further provided with a second position-limiting portion, wherein in the thickness direction of the end cover, the cover body is located on one side of the second position-limiting portion facing away from the electrode assembly, and the second position-limiting portion is used for restricting the movement of the cover body relative to the case in a direction facing the electrode assembly.

The second position-limiting portion may serve to prevent the end cover from pressing against electrode tab and avoid damage to the electrode assembly.

In some embodiments, the sealing member isolates the end cover from the case, so that the end cover is insulated from and connected to the case.

While sealing the end cover and the case, the sealing member also insulates the end cover from the case to reduce the risk of short circuiting.

In some embodiments, the case is a cylindrical case, the protrusion is annularly distributed around the circumference of the end cover, and the cross-section of the protrusion is semicircular.

When the first position-limiting portion and the sealing member are folded in the direction towards the end cover by the protrusion with semicircular cross-section, the folded first portion can better fit the shape of the protrusion, thereby more tightly tightening the sealing member and improving the sealability of the battery cell.

In some embodiments, the cross-sectional radius of the protrusion is R1, and in the unfolded state of the first position-limiting portion, the length L1 of the first portion satisfies: $\pi \times R1 < L1 < 10$ mm.

That is, L1 is greater than the upper half circumference of the semicircular protrusion, which can ensure that the first portion completely clads the upper surface of the protrusion, thus improving the sealability; and in addition, L1 is less than 10 mm, so that the first portion is not easily wrinkled after being folded, and a smooth surface is formed.

In some embodiments, the radius of the case is R2, and in the unfolded state of the first position-limiting portion, the length L2 of the second portion satisfies: 2 mm$<L2<R2-6$ mm.

The length L2 of the second portion is greater than 2 mm, so that there is enough welding zone when the second portion is connected to the bus member by welding, thus ensuring the over-current area of the battery cell; and L2 is less than the radius R2 of the case minus 6 mm, that is, an end of the second portion facing the center of the end cover is maintained at a distance greater than 6 mm from the center of the end cover, so that the second portion does not interfere with other components in the center of the end cover, such as an electrode terminal and the like.

A second aspect of embodiments of the present application provides a battery characterized by comprising a plurality of battery cells according to the first aspect of the present application.

A third aspect of embodiments of the present application provides an electrical apparatus characterized by comprising the battery according to the second aspect of the present application for providing electric energy.

A fourth aspect of embodiments of the present application provides a method for preparing a battery cell, which comprises providing an electrode assembly; providing a case having an opening and a first position-limiting portion; providing an end cover; providing a sealing member; accommodating the electrode assembly within the case; and covering the opening with the end cover, wherein in the thickness direction of the end cover, the end cover is located on one side of the first position-limiting portion facing the electrode assembly, and the first position-limiting portion is used for restricting the movement of the end cover in the direction away from the electrode assembly; the end cover and the first position-limiting portion are sealed with the sealing member, so that the end cover and the first position-limiting portion are in sealed connection; and the end cover comprises a cover body and a protrusion protruding from the surface of the cover body facing away from the electrode assembly in the thickness direction of the end cover, and at least part of the sealing member is clamped between the protrusion and the first position-limiting portion.

A fifth aspect of embodiments of the present application provides a device for preparing a battery cell, comprising: a first providing means for providing an electrode assembly; a second providing means for providing a case having an opening and a first position-limiting portion; a third providing means for providing an end cover; a fourth providing means for providing a sealing member; and an assembling means for accommodating the electrode assembly within the case, and for covering the opening with the end cover; wherein in the thickness direction of the end cover, the end cover is located on one side of the first position-limiting portion facing the electrode assembly, and the first position-limiting portion is used for restricting the movement of the end cover in the direction away from the electrode assembly; the sealing member is used to seal the end cover and the first position-limiting portion, so that the end cover and the first position-limiting portion are in sealed connection; and the end cover comprises a cover body and a protrusion protruding from the surface of the cover body facing away from the electrode assembly in the thickness direction of the end cover, and at least part of the sealing member is clamped between the protrusion and the first position-limiting portion.

It should be understood that the above general description and the following detailed description are exemplary only, and do not limit the present application.

DESCRIPTION OF DRAWINGS

In order to more clearly illustrate the technical solutions of the embodiments of the present application, a brief description of the accompanying drawings to be used in the embodiments of the present application will be given below; it is obvious that the drawings described below are merely specific embodiments of the present application, and those skilled in the art can obtain other embodiments according to the following drawings without involving creative efforts.

REFERENCE NUMERALS

Figure 1:
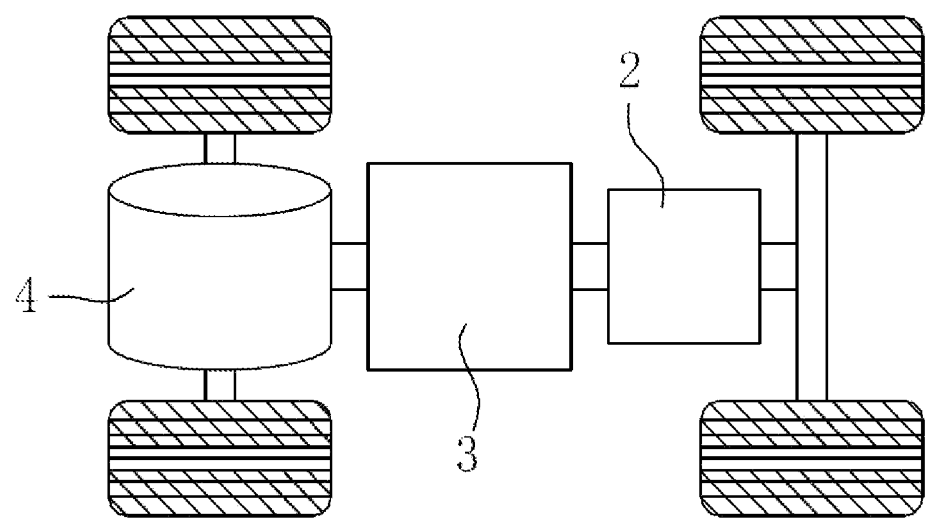
FIG. 1 is a schematic structural view of a vehicle provided in some embodiments of the present application.

1—Vehicle, 2—Battery, 3—Controller, 4—Motor;
10—Box body, 20. Battery cell, 30. Bus member;
11—Canister body, 12—First cover body, 13—Second cover body;
21—End cover, 211—Cover body, 212—Protrusion;
22—Electrode assembly, 221—Electrode tab;
23—Case, 231—Opening, 232—First position—limiting portion, 2321—First portion, 2322—Second portion, 2323—End of first portion near center of end cover, 2324—Folded portion, 233—Second position—limiting portion, 2331—Roller groove, 234—Notch, 2341—Tangential edge, 235—Case body;
24—Sealing member;
500—Device for preparing battery cell, 501—First providing means, 502—Second providing means, 503—Third providing means, 504—Fourth providing means, 505—Assembling means.

The accompanying drawings here, which are incorporated into and constitute a part of the specification, illustrate embodiments consistent with the present application, and together with the specification, serve to explain the principles of the present application.

DETAILED DESCRIPTION

In order to better understand the technical solutions of the present application, embodiments of the present application are described in detail below in conjunction with the accompanying drawings.

It should be clear that the described embodiments are only a part of the embodiments of the present application, but not all of them. Based on the embodiments in the present application, all other embodiments obtained by those of ordinary skill in the art without involving creative efforts fall within the scope of protection of the present application.

The terms used in the embodiments of the present application are only for the purpose of describing particular embodiments, and are not intended to limit the present application. The singular forms “a”, “an”, and “the” as used in the embodiments of the present application and the appended claims are also intended to include plural forms, unless the context clearly indicates otherwise.

It should be understood that the term “and/or” as used herein is only an association relationship for describing the associated objects, indicating that there may be three relationships, e.g., A and/or B may indicate three situations: A alone; both A and B; and B alone. Additionally, the character “/” herein generally indicates that the contextually associated objects are in an “or” relationship.

It is to be noted that the orientation words “upper”, “lower”, “left”, “right” and the like in the description of the embodiments of the present application are described from the perspective shown in the drawings, and should not be construed as limiting the embodiments of the present application. In addition, in the context, it is also to be understood that when an element is referred to as being connected “above” or “below” to another element, it can be connected not only directly “above” or “below” to another element, but also can be connected indirectly “above” or “below” to another element through an intervening element.

At present, from the development of market situation, the application of power batteries is more and more widespread. Power batteries are not only used in energy storage power source systems such as hydropower, firepower, wind power and solar power stations, but also widely used in electric vehicles such as electric bicycles, electric motorcycles and electric cars, as well as military equipment, aerospace, and many other fields. With the continuous expansion of the application fields of power batteries, the market demand is also constantly expanding.

In the field of electric vehicles such as electric cars, power batteries as the core components of the vehicles are related to the safety of the vehicles, and the safety and reliability of power batteries have become one of the most important criteria to judge the performance of power batteries.

The battery mentioned in the embodiments of the present application refers to a single physical module comprising one or more battery cells for providing higher voltage and capacity. For example, the battery mentioned in the present application may include a battery module or a battery pack, etc. A battery generally comprises a box body for encapsulating one or more battery cells. The box body can prevent liquids or other foreign matters from affecting the charging or discharging of the battery cells.

At present, a battery cell generally comprises a case, an electrode assembly and an end cover, wherein the end cover is provided with an electrode terminal, the electrode assembly is electrically connected to the electrode terminal, and the opening of the case is covered with the end cover to provide a closed space for the electrode assembly and an electrolyte solution.

For a cylindrical battery cell, the opening of the case is covered with the end cover, a sealing member is further provided between the end cover and the case to ensure the sealability of the battery cell, and generally, the sealing member also has insulating function, so that the end cover is insulated from and connected to the case. After installing the end cover and the sealing member, in the length direction of the battery cell, the portions of the case and the sealing member beyond the end cover are folded in the direction towards the end cover, so that the case forms a first position-limiting portion for limiting the position of the end cover, the motion of the end cover in the direction away from the electrode assembly is restricted, and the first position-limiting portion and the end cover clamp the sealing member to realize an overall sealing of the battery cell. The materials of the case and the end cover may be a variety of materials, such as for example, copper, iron, aluminum, stainless steel, aluminum alloy, and the like.

The applicant has noticed that the case is folded in the direction towards the end cover to form the first position-limiting portion, and a plastic deformation is generated at the root position of the folding, so that the first position-limiting portion and the end cover clamp the sealing member to form a seal; however, due to the properties of the case material, the first position-limiting portion may be upwarping in use and fail to clamp the sealing member, thus affecting the sealability of the whole battery cell.

In order to address the above-mentioned problem, the applicant has improved the structure of the battery cell by providing a protrusion on the end cover, and clamping the sealing member between the first position-limiting portion and the protrusion when the case is folded in the direction towards the end cover, thereby improving the sealability of the battery cell. The embodiments of the present application are further described below.

The battery cells described in the embodiments of the present application are applicable to batteries and apparatuses using batteries.

An apparatus using battery may be a vehicle, a mobile phone, a portable device, a laptop, a ship, a spacecraft, an electric toy and an electric tool, etc. The vehicle may be a fuel vehicle, a gas vehicle or a new energy vehicle, and the new energy vehicle may be an all-electric vehicle, a hybrid vehicle, an extended range electric vehicle, and the like; the spacecraft includes an airplane, a rocket, a space shuttle, a spaceship, and the like; the electric toy includes a stationary electric toy or a mobile electric toy, such as a game machine, an electric car toy, an electric boat toy, an electric airplane toy, and the like; and the electric tool includes a metal cutting electric tool, a grinding electric tool, an assembling electric tool and a railway electric tool, such as an electric drill, an electric grinder, an electric wrench, an electric screwdriver, an electric hammer, an impact electric drill, a concrete vibrator, an electric planer, and the like. The above-mentioned apparatuses using batteries are not particularly limited in the embodiments of the present application.

For convenience, the following embodiments are illustrated with a vehicle as an example of apparatuses using batteries.

FIG. 1 is a schematic structural view of a vehicle 1 provided in some embodiments of the present application.

As shown in FIG. 1, the interior of the vehicle 1 is provided with a battery 2, which refers to a single physical module comprising one or more battery cells for providing higher voltage and capacity; for example, the battery 2 mentioned in the present application may comprise a battery module or a battery pack, etc. The battery 2 may be provided at the bottom or the head or the rear of the vehicle 1. The battery 2 may be used to power the vehicle 1, for example, the battery 2 may be used as an operating power source for the vehicle 1. The vehicle 1 may further comprise a controller 3 and a motor 4, and the controller 3 is used to control the battery 2 to power the motor 4, e.g. for the operating power demand of the vehicle 1 during start-up, navigation and driving.

In some embodiments of the present application, the battery 2 can be used not only as the operating power source for the vehicle 1, but also as a driving power source for the vehicle 1 to replace or partially replace fuel or natural gas to provide driving power for the vehicle 1.

Figure 2:
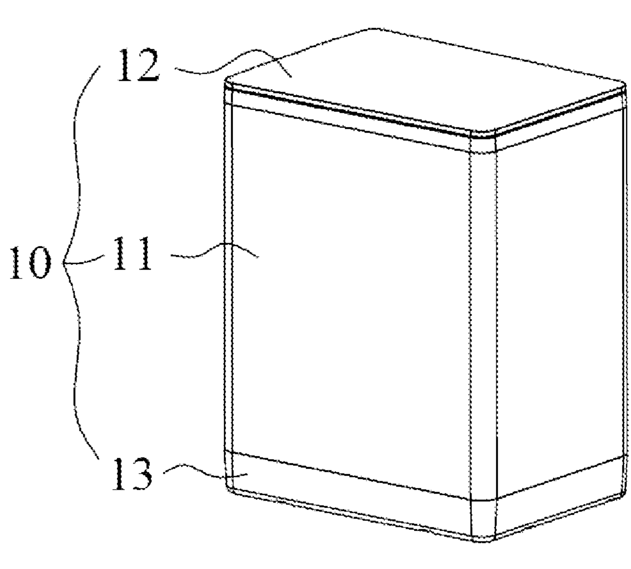
FIG. 2 is a schematic structural view of a battery provided in some embodiments of the present application.
Figure 3:
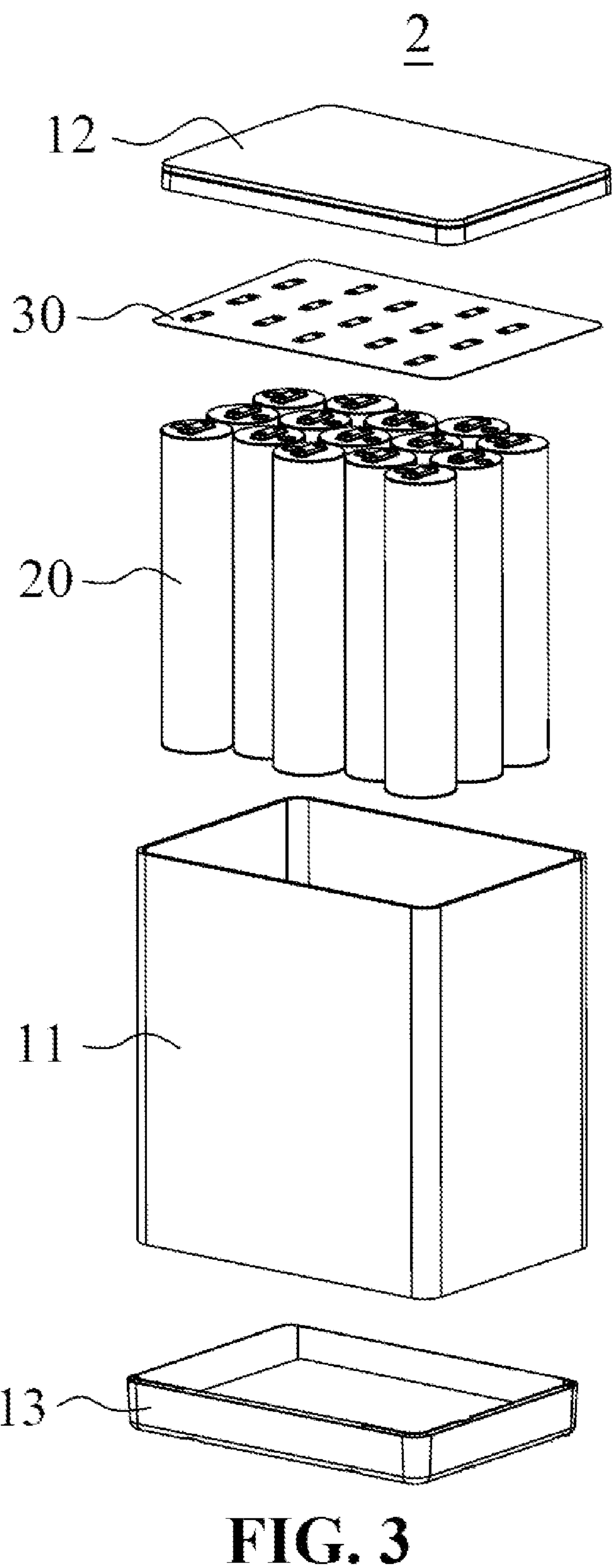
FIG. 3 is an exploded schematic view of the battery in FIG. 2.

FIG. 2 is a schematic structural view of a battery 2 provided in some embodiments of the present application. FIG. 3 is an exploded schematic view of the battery 2 in FIG. 2.

As shown in FIG. 2 and FIG. 3, the battery 2 comprises a box body 10 and a battery cell 20 accommodated within the box body 10.

The box body 10 is used for accommodating the battery cell 20, and the box body may have various structures. In some embodiments, the box body 10 comprises a canister body 11, a first cover body 12 and a second cover body 13. The first cover body 12 and the second cover body 13 are provided at both ends of the canister body 11, respectively. The first cover body 12 and the second cover body 13 are detachably connected to the canister body 11, respectively. For example, the first cover body 12 and the second cover body 13 may be snap-fitted or screwed to the canister body 11, respectively. The canister body 11, the first cover body 12 and the second cover body 13 are assembled to form an accommodating space. The battery cell 20 is provided within the accommodating space of the housing box body 10.

In the battery 2, there are a plurality of battery cells 20. The plurality of battery cells can be connected in series or parallel or in a parallel-series connection, wherein the parallel-series connection means that the plurality of battery cells 20 are connected in both series and parallel. The plurality of battery cells 20 can be directly connected together in series or parallel or in parallel-series connection, and then the whole of the plurality of battery cells 20 is accommodated within the box body 10; of course, it is also possible that a plurality of battery cells are first connected in series or parallel or in parallel-series connection to form a battery group, and then a plurality of battery groups are connected in series or parallel or in parallel-series connection to form a whole and accommodated within the box body 10.

The number of battery cells 20 can be set to any numerical value according to different power demands. The plurality of battery cells 20 can be connected in series, in parallel, or in parallel-series connection to achieve a larger capacity or power. it is also possible that a plurality of battery cells 20 are first connected in series or parallel or in parallel-series connection to form a battery module, and then a plurality of battery modules are connected in series or parallel or in parallel-series connection to form the battery 2. That is, the plurality of battery cells 20 can directly form the battery 2, or they can first form battery modules, which then form the battery 2, which is accommodated within the box body 10.

As shown in FIG. 3, the plurality of battery cells 20 are electrically connected through a bus member 30 to achieve a designed voltage of the battery 2. In the battery 2, the plurality of battery cells 20 are electrically connected, the specific connection mode can be series connection, parallel connection or parallel-series connection (series and parallel parallel-series connection), etc., and the battery cells 20 are connected through the bus member 30. The battery cells 20 comprise electrode terminals, and each battery cell 20 comprises a positive electrode terminal and a negative electrode terminal. For example, when the battery cells 20 are connected in series, the positive electrode terminal of a battery cell 20 and the negative electrode terminal of the battery cell 20 adjacent thereto are connected through the bus member 30. The structure of the bus member 30 is determined by the arrangement of the plurality of battery cells 20 and the connection mode of the battery cells 20. The specific connection mode of the battery cells 20 is not limited in the present application. The bus member 30 may be a metal conductor, such as for example, copper, iron, aluminum, stainless steel, aluminum alloy, and the like.

Figure 4:
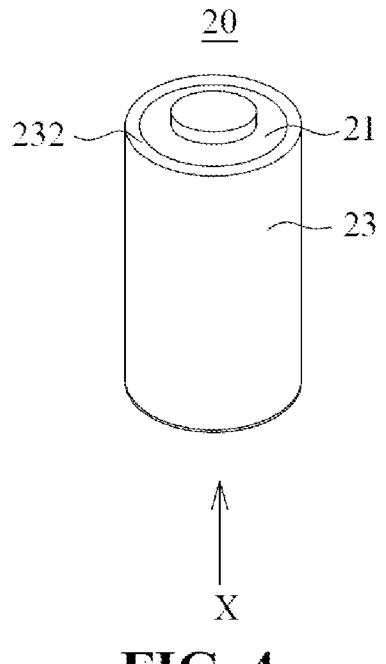
FIG. 4 is a schematic structural view of a battery cell provided in some embodiments of the present application.
Figure 5:
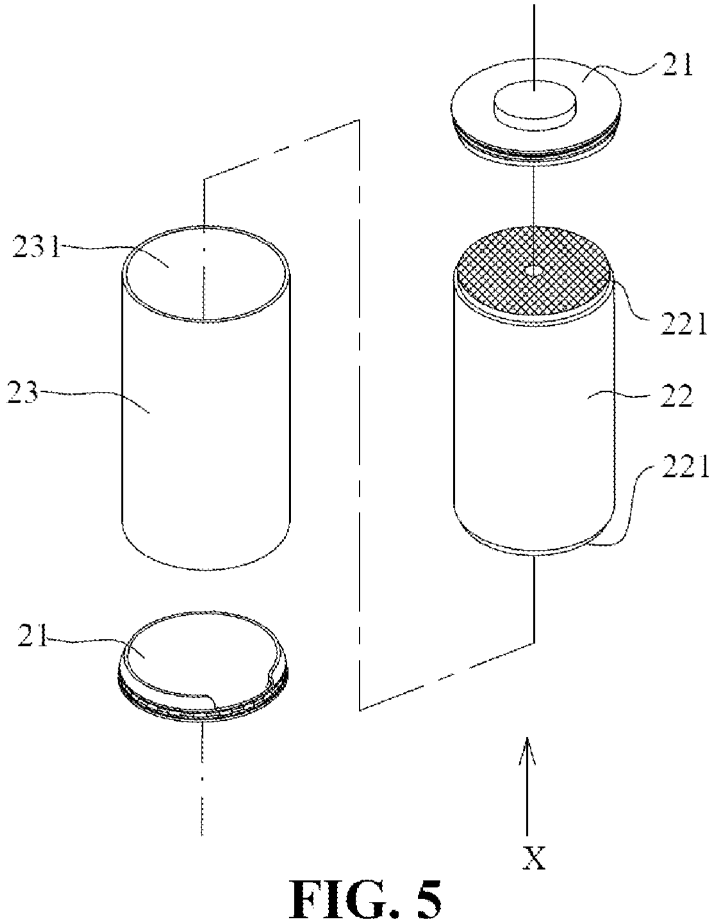
FIG. 5 is an exploded schematic view of the battery cell in FIG. 4.

FIG. 4 is a schematic structural view of a battery cell 20 provided in some embodiments of the present application. FIG. 5 is an exploded schematic view of the battery cell in FIG. 4.

Referring to FIG. 4, the battery cell 20 refers to the smallest constituent unit used to make up the battery 2, and in some embodiments of the present application, the battery cell 20 may include a lithium-ion secondary battery cell, a lithium-ion primary battery cell, a lithium-sulfur battery cell, a sodium/lithium ion battery cell, a sodium-ion battery cell or a magnesium-ion battery cell, etc, which are not limited in the embodiments of the present application. The battery cell 20 may have a shape of cylinder, flat body, rectangular parallelepiped or other shapes, and for convenience of explanation, a cylindrical battery cell 20 is exemplified in the following embodiments.

Referring to FIG. 4 and FIG. 5, the battery cell 20 comprises an end cover 21, an electrode assembly 22 and a case 23. The case 23 is used to accommodate the electrode assembly 22 within the case 23. The case 23 can be of a variety of shapes and sizes, and specifically, the shape of the case 23 can be determined according to the specific shapes and sizes of the one or more electrode assemblies 22. In some embodiments, the case 23 is a hollow cylinder. One end of the case 23 is an opening 231, and the end cover 21 covers the opening 231 and is connected to the case 23, thus forming a closed cavity in which the electrode assembly 22 is placed. The cavity can be filled with an electrolyte solution. In some embodiments, the end cover 21 is provided with an electrode terminal, the electrode assembly 22 is provided with an electrode tab 221, and the electrode terminal can be electrically connected to the electrode tab 221 for outputting the electric energy of the battery cell 20. Each electrode terminal can be correspondingly provided with a current collecting member, which can be positioned between the end cover 21 and the electrode tab 221, so that the electrode terminal and the electrode tab 221 can be electrically connected through the current collecting member. The end cover 21 may further be provided with other functional components, for example, a pressure relief mechanism for releasing internal pressure when the internal pressure or temperature of the battery cell 20 reaches a threshold value. The materials of the case 23 and the end cover 21 may be a variety of materials, such as for example, copper, iron, aluminum, stainless steel, aluminum alloy, and the like.

With continued reference to FIG. 4, in some embodiments, the case 23 has a first position-limiting portion 232 at an end in the length direction X of the battery cell, and after the electrode assembly 22 is installed within the case 23, the opening 231 of the case 23 is covered with the end cover 21, and the first position-limiting portion 232 is folded in the direction towards the end cover 21 to restrict the movement of the end cover 21 in the direction away from the electrode assembly 22.

In some embodiments, a sealing member 24 (see FIG. 7) is further provided between the end cover 21 and the case 23 to ensure the sealability of the battery cell 20. After installing the end cover 21 and the sealing member 24, the portions of the case 23 and the sealing member 24 beyond the end cover 21 are folded in the direction towards the end cover 21, so that the case 23 forms the first position-limiting portion 232 for limiting the position of the end cover 21, and the first position-limiting portion 232 and the end cover 21 clamp the sealing member 24 to realize an overall sealing of the battery cell 20.

When the first position-limiting portion 232 is folded in the direction towards the end cover 21, a plastic deformation is generated at the root position of the folding, so that the first position-limiting portion 232 and the end cover 21 clamp the sealing member to form a seal; however, due to the properties of the material of the case 23, the first position-limiting portion 232 may upwarp in use and fail to clamp the sealing member 24, thus affecting the sealability of the whole battery cell 20.

In order to address the problem that the seal of the battery cell 20 is not tight due to the upwarping of the first position-limiting portion 232, in some embodiments of the present application, a protrusion 212 is provided on the end cover 21 (see FIG. 7 and FIG. 8), and when the first position-limiting portion 232 is folded in the direction towards the end cover 21, the sealing member 24 is clamped between the first position-limiting portion 232 and the protrusion 212, so that the sealability of the battery cell 20 is improved.

Figure 6:
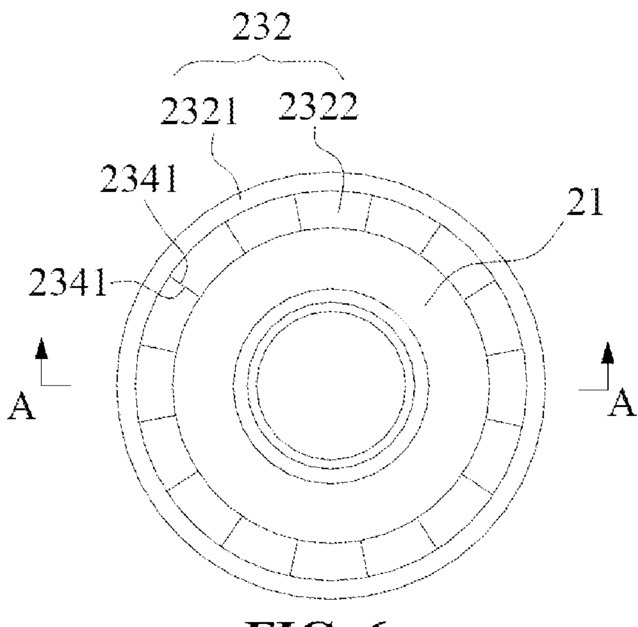
FIG. 6 is a top view of a battery cell according to some embodiments of the present application.
Figure 7:
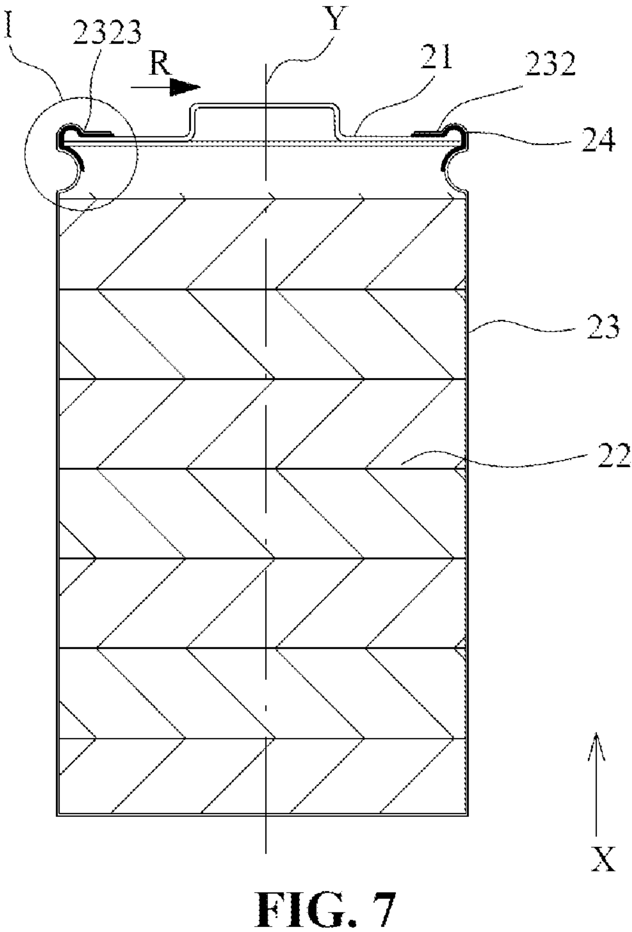
FIG. 7 is a sectional view in the A-A direction of FIG. 6.

FIG. 6 is a top view of a battery cell 20 according to some embodiments of the present application; FIG. 7 is a sectional view in the A-A direction of FIG. 6; and FIG. 8 is an enlarged view of portion I in FIG. 7.

As shown in FIG. 6 and FIG. 7, the battery cell 2 according to some embodiments of the present application comprises: an electrode assembly 22, an end cover 21, a case 23 and a sealing member 24. The electrode assembly 22 is accommodated within the case 23 having the first position-limiting portion 232, the opening 231 of the case 23 is covered with the end cover 21, and in the thickness direction of the end cover 21 (the same as the length direction X of the battery cell), the end cover 21 is located on the side of the first position-limiting portion 232 facing the electrode assembly 22, the first position-limiting portion 232 restricts the movement of the end cover 21 in the direction away from the electrode assembly 22; and the sealing member 24 is used to seal the end cover 21 and the first position-limiting portion 232, so that the end cover 21 and the first position-limiting portion 232 are in sealed connection.

Figure 8:
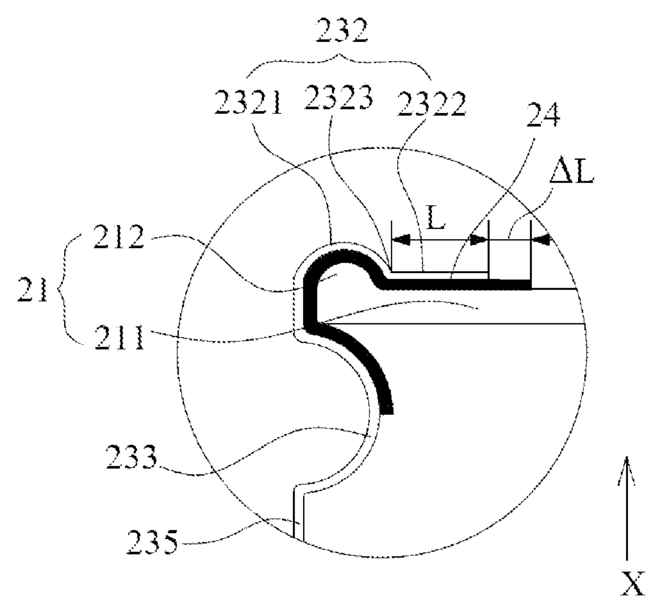
FIG. 8 is an enlarged view of portion I in FIG. 7.

Referring to FIG. 7 and FIG. 8, the end cover 21 comprises a cover body 211 and a protrusion 212 protruding from the surface of the cover body 211 facing away from the electrode assembly 22 in the thickness direction of the end cover 21, and at least part of the sealing member 24 is clamped between the protrusion 212 and the first position-limiting portion 232.

The protrusion 212 is provided on the surface of the end cover 21 facing away from the electrode assembly 22, and after the opening 231 of the case 23 is covered with the end cover 21, at least part of the sealing member 24 is clamped between the protrusion 212 and the first position-limiting portion 232, so that the first position-limiting portion 232 and the protrusion 212 clamp the sealing member 24 to ensure the sealability of the battery cell 20.

Referring to FIG. 8, in some embodiments, the first position-limiting portion 232 is a flanging structure formed on the surface side of the end cover 21 facing away from the electrode assembly 22 by partially folding the case 23 towards the end cover 21.

After the opening 231 of the case 23 is covered with the end cover 21, the first position-limiting portion 232 of the case and the sealing member 24 are folded together in the direction towards the end cover 21 to form the flanging structure, so that the folded portion of the sealing member 24 clads the protrusion 212, and the flanging structure of the first position-limiting portion 232 clads the sealing member 24, so that the first position-limiting portion 232 and the protrusion 212 can clamp and jointly press against the sealing member 24, thereby improving the sealability of the battery cell 20.

With continued reference to FIG. 7 and FIG. 8, in some embodiments, the first position-limiting portion 232 comprises a first portion 2321 and a second portion 2322 which are connected, the first portion 2321 clads the protrusion 212, and the second portion 2322 extends a first predetermined distance L from an end 2323 of the first portion 2321 near the center of the end cover 21 towards the center of the end cover 21. The central position of the end cover 21 is located on the central axis Y of the case 23 (see the dotted line in FIG. 7), and for a cylindrical battery cell, the direction towards the center of the end cover 21 is the radial direction R of the case 23 (see the arrow direction above the end cover 21 in FIG. 7).

After the first position-limiting portion 232 is folded in the direction towards the end cover 21, a portion that clads the protrusion 212 forms the first portion 2321, and a portion extending from an end 2323 of the first portion 2321 towards the central axis Y forms the second portion 2322. The first portion 2321 completely clads the protrusion 212, and the second portion extends the first predetermined distance L towards the center of the end cover 21, so that the sealability of the battery cell 20 is better, and the width of the second portion 2322 is the first predetermined distance L, so that a bus member 30 can be connected to the second portion 2322, thus realizing the electric connection of multiple battery cells 20.

The bus member 30 can generally be welded to the second portion 2322 by welding. After the first position-limiting portion 232 is folded in the direction towards the end cover 21, an end part of the first position-limiting portion 232 extends in the direction towards the center of the end cover (the direction of the central axis Y), and the diameter of the end part of the first position-limiting portion 232 towards the center of the end cover is gradually reduced; however, since the case 23 is a complete cylinder structure before being folded in the direction towards the end cover 21, and the diameter thereof is a fixed value, the first position-limiting portion 232 shrinks in the direction towards the center of the end cover after being folded, thereby generating wrinkles, so that the first position-limiting portion 232 cannot be completely smoothed, and when the first position-limiting portion 232 is connected to the bus member 30 by welding, a false welding tends to occur, which affects the connection strength of the battery 2 as a whole, and has a risk of short circuiting.

In addition, since the case 23 is generally made of a metal material, due to the properties of the metal material, the width of the flanging structure of the first position-limiting portion 232 is generally smaller when the case 23 is folded in the direction towards the center of the end cover, and when the first position-limiting portion 232 is connected to the bus member 30 by welding, the area of welding zone is relatively small due to the narrower flanging structure, so that the over-current area of the battery cell 20 is smaller.

Figure 9:
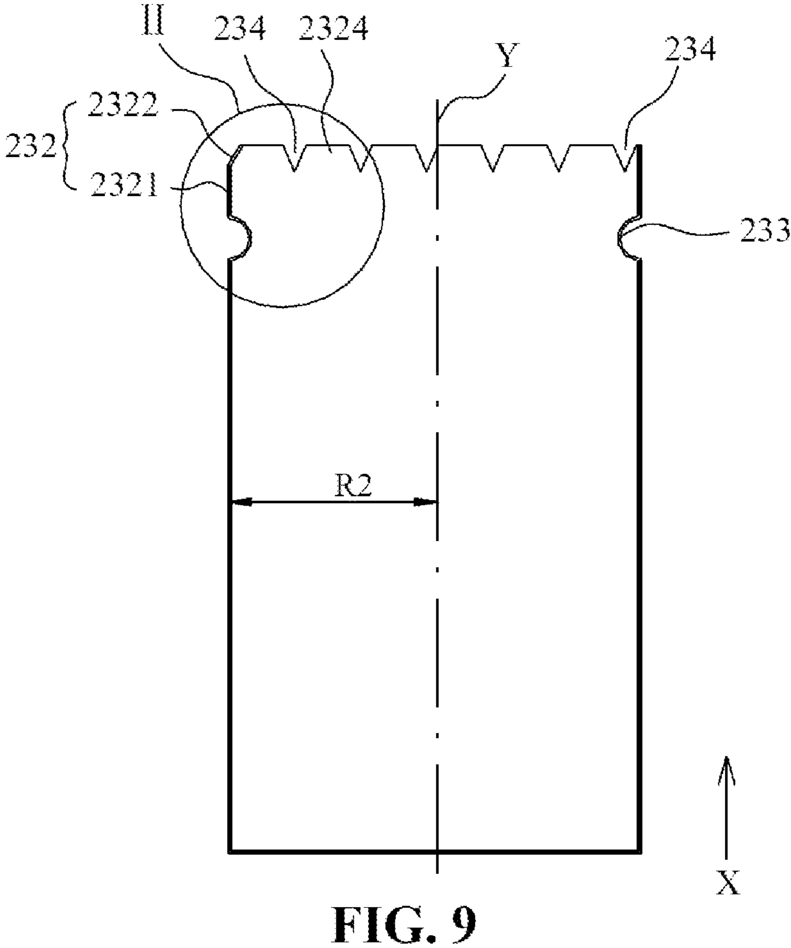
FIG. 9 is a sectional view of a case according to some embodiments of the present application.

FIG. 9 is a sectional view of a case 23 according to some embodiments of the present application.

As shown in FIG. 9, in order to avoid the problems that the first position-limiting portion 232 wrinkles after being folded and the area of welding zone is smaller, in some embodiments, in the unfolded state of the first position-limiting portion 232, the second portion 2322 comprises a plurality of notches 234 spaced around a central axis Y of the case 23, and each notch 234 extends to an end of the second portion 2322 away from the first portion 2321.

The plurality of notches 234 are spaced, so that the second portion 2322 is divided into a plurality of folded portions 2324 spaced around the central axis Y of the case 23, wherein after the first position-limiting portion 232 is folded in the direction towards the end cover 21, and the first portion 2321 clads the protrusion 212, the plurality of spaced folded portions 2324 extend in the direction towards the center of the end cover, respectively, thereby avoiding the formation of wrinkles in the second portion 2322 during folding and smoothing. In addition, due to the provision of the plurality of notches 234, the first predetermined distance L that the plurality of folded portions 2324 extend in the direction towards the center of the end cover can be set wider, and when the bus member 30 is connected to the second portion 2322 by welding, the area of welding zone is increased, and the over-current area is increased.

Figure 10:
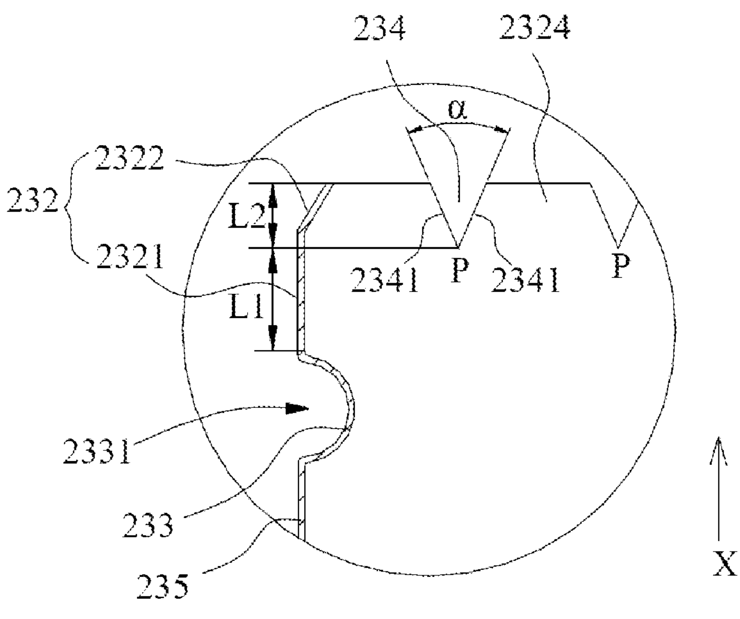
FIG. 10 is an enlarged view of portion II of FIG. 9.

FIG. 10 is an enlarged view of portion II of FIG. 9.

As shown in FIG. 10, in some embodiments, the notch 234 comprises two tangential edges 2341 intersecting at a vertex P and forming a predetermined angle, and after the first position-limiting portion 232 is folded towards the end cover 21, the two tangential edges 2341 leading from the vertex P are butted, so that the second portion 2322 forms a complete annular structure, as shown in FIG. 6.

The two tangential edges 2341 of the notch 234 are butted and overlapped after the first position-limiting portion 232 is folded towards the end cover 21, so that the second portion 2322 covers the upper surface of the end cover 21 to form a complete annular structure which, due to the absence of wrinkles, does not create a false welding when the bus member 30 is welded to the second portion 2322, thus ensuring weld strength. Also, there is no gap formed after the second portion 2322 is folded to the upper surface of the end cover 21 due to the presence of the notch 234, and the area of welding zone is not affected.

In some specific embodiments, the number N of the notches 234 can be set to be greater than or equal to 4, the intersection angle α between the two tangential edges 2341 of the notch 234 varies according to the number of the notches 234, and for a cylindrical battery cell 20, the relationship between the intersection angle α and the number N is: $N\times\alpha=360°$. See Table 1 below for the specific intersection angle α and number N.

TABLE 1

Comparison table of the intersection angle and the number

| Number N | 4 | 5 | 6 | 8 | 9 | . . . | N |
|---|---|---|---|---|---|---|---|
| Intersection angle α° | 90° | 72° | 60° | 45° | 40° | . . . | (360/N)° |

The intersection angle α and the number N can be set according to the outer shapes and sizes of the battery cells 20; when the radius R2 of the case 23 (see FIG. 9) is larger, the number N can be set to be larger, and when the radius R2 of the case 23 is smaller, the number N can be set to be relatively small, thus enabling flexible setting according to the outer shapes and sizes of the battery cells 20.

With continued reference to FIG. 8 to FIG. 10, in some embodiments, the case 23 is further provided with a second position-limiting portion 233, wherein in the thickness direction of the end cover 21 (the length direction X of the battery cell), the cover body 211 is located on the side of the second position-limiting portion 233 facing away from the electrode assembly 22, and the second position-limiting portion 233 is used for restricting the movement of the cover body 211 relative to the case 23 in a direction facing the electrode assembly 22. The second position-limiting portion 233 may serve to prevent the end cover 21 from pressing against electrode tab 221 and avoid damage to the electrode assembly 22.

Specifically, the second position-limiting portion 233 is formed between the case body 235 of the case 23 and the first position-limiting portion 232. Exemplarily, the second position-limiting portion 233 may be an annular structure protruding from an inner circumferential surface of the case body 235.

Optionally, a roller groove 2331 is formed on an outer circumferential surface of the case body 235 at a position corresponding to the second position-limiting portion 233. In the actual molding process, the roller groove 2331 can be rolled out on the outer circumferential surface of the case body 235 by rolling, and the second position-limiting portion 233 that is inwardly protruding is formed on the inner circumferential surface of the case body 235.

In some embodiments, the end cover 21 and the case 23 are oppositely charged; for example, if the end cover 21 is negatively charged, the case 23 is positively charged, or if the end cover 21 is positively charged, the case 23 is negatively charged, and in order to avoid short circuit due to contact between the end cover 21 and the case 23, the end cover 21 needs to be insulated from the case 23. In some embodiments, the sealing member 24 isolates the end cover 21 from the case 23, so that the end cover 21 is insulated from and connected to the case 23. While sealing the end cover 21 and the case 23, the sealing member 24 also insulates the end cover 21 from the case 23 to reduce the risk of short circuiting.

With continued reference to FIG. 8, the sealing member 24 is a cylinder-shaped structure that fits the inner surface of the case 23, the end cover 21 is installed on the inner side of the sealing member 24, and the sealing member 24 completely isolates the case 23 from the end cover 21, thus achieving the purpose of insulation. In some embodiments, the end of one side of the sealing member 24 is located in the middle of the second position-limiting portion 233, and the end of the other side extends a second predetermined distance ΔL from an end of the second portion 2322 near the center of the end cover. Specifically, the second predetermined distance ΔL≥5 mm.

The material of the sealing member 24 may be a high molecular plastic such as polyethylene, polypropylene, polytetrafluoroethylene, and the like, and in a specific embodiment, the sealing member 24 may be made of polyethylene material with a thickness of 0.8 mm.

Since the second position-limiting portion 233 protrudes on the inner circumferential surface of the case body 235 towards the inside of the case 23, the edge of the surface of the end cover 21 facing the electrode assembly 22 is supported by the end part of the second position-limiting portion 233 away from the electrode assembly 22 in the length direction X of the battery cell, the end of one side of the sealing member 24 is located in the middle of the second position-limiting portion 233, the surface of the end cover 21 facing the electrode assembly 22 can be completely isolated from the case 23, and the sealing member 24 extends until the end of the second portion 2322 near the center of the end cover protrudes by the second predetermined distance ΔL, so that the surface of the end cover 21 facing away from the electrode assembly 22 can be completely isolated from the case 23, thus avoiding contact of the end cover 21 with the case 23 and achieving sufficient insulation.

Figure 11:
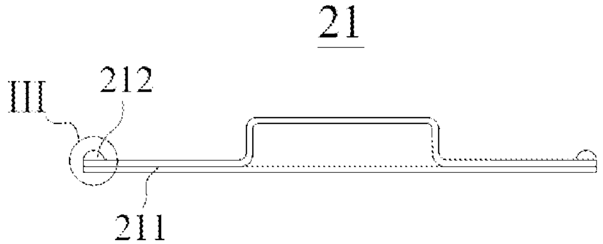
FIG. 11 is a cross-sectional view of an end cover according to some embodiments of the present application.
Figure 12:
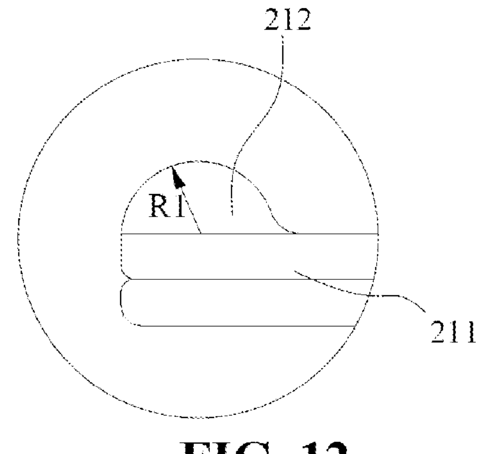
FIG. 12 is an enlarged view of portion III of FIG. 11.

FIG. 11 is a cross-sectional view of an end cover 21 according to some embodiments of the present application; and FIG. 12 is an enlarged view of portion III in FIG. 11.

As shown in FIGS. 11 and 12, in some embodiments, the case 23 is a cylindrical case, the end cover 21 is a circular end cover that fits with the opening 231, the protrusion 212 is annularly distributed around the circumference of the end cover 21, the cross-section of the protrusion 212 is semicircular, and when the first position-limiting portion 232 and the sealing member 24 are folded in the direction towards the end cover 21 by the protrusion 212 with the semicircular cross-section, the folded first portion 2321 can better fit the shape of the protrusion 212, thereby more tightly tightening the sealing member 24 and improving the sealability of the battery cell 20.

Specifically, in some embodiments, the cross-sectional radius of the protrusion 212 is R1, and in the unfolded state of the first position-limiting portion 232, the length L1 of the first portion 2321 satisfies: π×R1<L1<10 mm. The length L1 of the first portion 2321 is greater than π×R1, that is, L1 is greater than the upper half circumference of the semicircular protrusion 212, which can ensure that the first portion 2321 completely clads the upper surface of the protrusion 212, thus improving the sealability; and in addition, L1 is less than 10 mm, so that the first portion 2321 is not easily wrinkled after being folded, and a smooth surface is formed. In a specific embodiment, R1 is equal to 2 mm, thus reducing the effects on the connection of the battery cell 20 to the other components, such as the bus member 30.

With continued reference to FIG. 8 and FIG. 9, in some embodiments, the radius of the case is R2, and in the unfolded state of the first position-limiting portion 232, the length L2 of the second portion 2322 satisfies: 2 mm<L2<R2−6 mm. The length L2 of the second portion 2322 is greater than 2 mm, so that there is enough welding zone when the second portion 2322 is connected to the bus member 30 by welding, thus ensuring the over-current area of the battery cell 20; and L2 is less than the radius R2 of the case 23 minus 6 mm, so that an end of the second portion 2322 facing the center of the end cover 21 is maintained at a distance greater than 6 mm from the center of the end cover 21, so that the second portion 2322 does not interfere with other components in the center of the end cover 21, such as an electrode terminal and the like.

Figure 13:
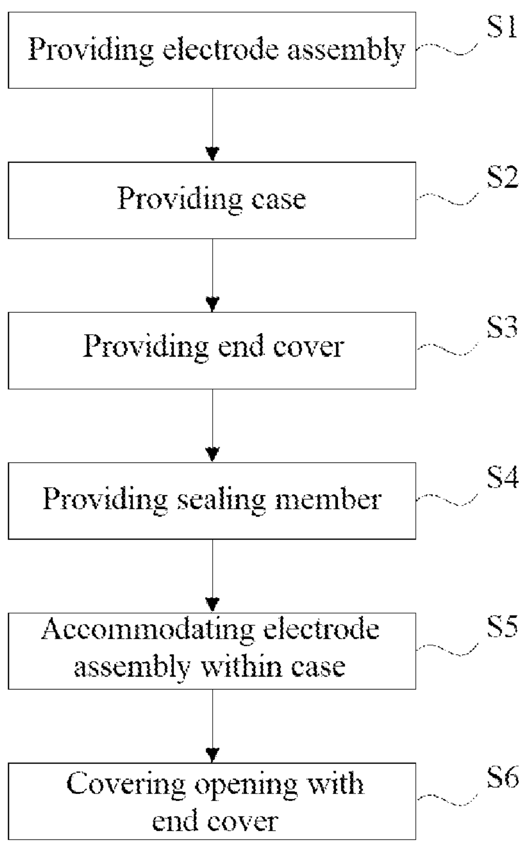
FIG. 13 is a flowchart of a method for preparing a battery cell according to some embodiments of the present application.

FIG. 13 is a flowchart of a method for preparing a battery cell 20 according to some embodiments of the present application.

As shown in FIG. 13, an embodiment of the present application provides a method for preparing a battery cell 20, comprising the steps of:

Step S1, providing an electrode assembly 22;

Step S2, providing a case 23 having an opening 231 and a first position-limiting portion 232;

Step S3, providing an end cover 21;

Step S4, providing a sealing member 24;

Step S5, accommodating the electrode assembly 22 within the case 23;

Step S6, covering the opening 231 with the end cover 21;

Wherein, in the thickness direction of the end cover 21, the end cover 21 is located on the side of the first position-limiting portion 232 facing the electrode assembly 22, and the first position-limiting portion 232 is used for restricting the movement of the end cover 21 in the direction away from the electrode assembly 22; the sealing member 24 is used for sealing the end cover 21 and the first position-limiting portion 232, so that the end cover 21 and the first position-limiting portion 232 are in sealed connection; the end cover 21 comprises the cover body 211 and the protrusion 212 protruding from the surface of the cover body 211 facing away from the electrode assembly 22 in the thickness direction of the end cover 21, and at least part of the sealing member 24 is clamped between the protrusion 212 and the first position-limiting portion 232.

In the above method, the order of step S1, step S2, step S3 and step S4 is not limited, such as for example, step S4 may be performed first, then step S3 is performed, then step S2 is performed, and then step S1 is performed.

With the method for preparing a battery cell according to embodiments of the present application, the protrusion 212 is provided on the surface of the end cover 21 facing away from the electrode assembly 22, and after the opening of the case 23 is covered with the end cover 21, at least part of the sealing member 24 is clamped between the protrusion 212 and the first position-limiting portion 232, so that the first position-limiting portion 232 and the protrusion 212 clamp the sealing member 24 to ensure the sealability of the battery cell 20.

Figure 14:
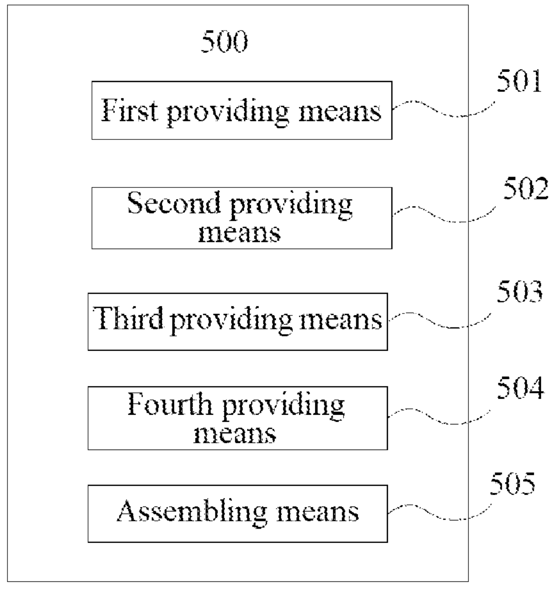
FIG. 14 is a schematic block diagram of a battery cell manufacturing device provided in some embodiments of the present application.

FIG. 14 is a schematic block diagram of a device 500 for preparing a battery cell 20 provided in some embodiments of the present application.

As shown in FIG. 14, embodiments of the present application further provide a device 500 for preparing a battery cell, comprising: a first providing means 501, a second providing means 502, a third providing means 503, a fourth providing means 504, and an assembling means 505.

The first providing means 501 is used for providing an electrode assembly 22; the second providing means 502 is used for providing a case 23 having an opening 231 and a first position-limiting portion 232; the third providing means 503 is used for providing an end cover 21; the fourth providing means 504 is used for providing a sealing member 24; and the assembling means 505 is used for accommodating the electrode assembly 22 within the case 23, and for covering the opening 231 with the end cover 21; wherein in the thickness direction of the end cover 21, the end cover 21 is located on one side of the first position-limiting portion 232 facing the electrode assembly 22, and the first position-limiting portion 232 is used for restricting the movement of the end cover 21 in the direction away from the electrode assembly 22; the sealing member 24 is used to seal the end cover 21 and the first position-limiting portion 232, so that the end cover 21 and the first position-limiting portion 232 are in sealed connection; the end cover 21 comprises a cover body 211 and a protrusion 212 protruding from the surface of the cover body 211 facing away from the electrode assembly 22 in the thickness direction of the end cover 21, and at least part of the sealing member 24 is clamped between the protrusion 212 and the first position-limiting portion 232.

With the device 500 for preparing a battery cell according to embodiments of the present application, the protrusion 212 is provided on the surface of the end cover 21 facing away from the electrode assembly 22, and after the opening of the case 23 is covered with the end cover 21, at least part of the sealing member 24 is clamped between the protrusion 212 and the first position-limiting portion 232, so that the first position-limiting portion 232 and the protrusion 212 clamp the sealing member 24 to ensure the sealability of the battery cell 20.

The above is only a description of the preferred embodiments of the present application, and is not intended to limit the present application, as for those skilled in the art, various modifications and changes of the present application are possible. Any modifications, equivalent substitutions and improvements made within the spirit and principle of the present application shall be included within the scope of protection of the present application.

The invention claimed is:

1. A battery cell, comprising:

an electrode assembly;

a case for accommodating the electrode assembly, wherein the case has an opening and a first position-limiting portion;

an end cover for covering the opening, wherein in a thickness direction of the end cover, the end cover is located on one side of the first position-limiting portion facing the electrode assembly, and the first position-limiting portion is used for restricting movement of the end cover in a direction away from the electrode assembly; and a sealing member for sealing the end cover and the first position-limiting portion, so that the end cover and the first position-limiting portion are in sealed connection;

wherein the end cover comprises a cover body and a protrusion protruding from surface of the cover body facing away from the electrode assembly in the thickness direction of the end cover, and at least part of the sealing member is clamped between the protrusion and the first position-limiting portion;

wherein the first position-limiting portion comprises a first portion and a second portion which are connected, the first portion covers the protrusion, and the second portion extends a first predetermined distance from an end of the first portion near a center of the end cover toward the center of the end cover; and wherein, in an unfolded state of the first position-limiting portion, the second portion comprises a plurality of notches spaced around a central axis of the case, and each notch extends to an end of the second portion away from the first portion; and wherein each of the plurality of notches comprises two tangential edges intersecting at a vertex and forming a predetermined angle, and after the first position-limiting portion is folded towards the end cover, the two tangential edges leading from the vertex are butted, so that the second portion forms a complete annular structure.

2. The battery cell according to claim 1, wherein the first position-limiting portion is a flanging structure formed on a surface side of the end cover facing away from the electrode assembly by partially folding the case towards the end cover.

3. The battery cell according to claim 1, wherein the case is further provided with a second position-limiting portion, wherein in the thickness direction of the end cover, the cover body is located on one side of the second position-limiting portion facing away from the electrode assembly, and the second position-limiting portion is used for restricting the movement of the cover body relative to the case in a direction facing the electrode assembly.

4. The battery cell according to claim 3, wherein a roller groove is formed on an outer circumferential surface of the case at a position corresponding to the second position-limiting portion.

5. The battery cell according to claim 3, wherein the second position-limiting portion is an annular structure protruding from an inner circumferential surface of a case body of the case.

6. The battery cell according to claim 3, wherein the second position-limiting portion is configured to prevent the end cover from pressing against an electrode tab.

7. The battery cell according to claim 3, wherein one end of the sealing member is located in a middle of the second position-limiting portion, and another end extends a second predetermined distance $\Delta L$ from an end of the second portion near the center of the end cover, wherein $\Delta L \geq 5$ mm.

8. The battery cell according to claim 1, wherein the sealing member isolates the end cover from the case, so that the end cover is insulated from and connected to the case.

9. The battery cell according to claim 1, wherein the case is a cylindrical case, the protrusion is annularly distributed around a circumference of the end cover, and a cross-section of the protrusion is semicircular.

10. The battery cell according to claim 9, wherein a cross-sectional radius of the protrusion is $R_1$, and in the unfolded state of the first position-limiting portion, a length $L_1$ of the first portion satisfies: $\pi \times R_1 < L_1 < 10$ mm.

11. The battery cell according to claim 9, wherein a radius of the case is $R_2$, and in the unfolded state of the first position-limiting portion, a length $L_2$ of the second portion satisfies: 2 mm$<L_2<R_2-6$ mm.

12. The battery cell according to claim 1, wherein a number N of the plurality of notches is greater than or equal to 4.

13. The battery cell according to claim 1, wherein the case is a cylindrical case, a number of the plurality of notches is N, the predetermined angle is $\alpha$, and $N\times\alpha=360°$.

14. The battery cell according to claim 1, wherein the sealing member has a cylinder-shaped structure fitting an inner surface of the case, and the end cover is installed on an inner side of the sealing member.

15. The battery cell according to claim 1, wherein the plurality of notches divide the second portion into a plurality of folded portions spaced around the central axis of the case, and after folding, the plurality of folded portions extend toward the center of the end cover.

16. The battery cell according to claim 1, wherein the second portion is welded to a bus member.

17. A battery, comprising a plurality of battery cells of claim 1.

18. An electrical apparatus, comprising the battery of claim 17, wherein the battery is used for providing electric energy.

19. A method for preparing a battery cell, the method comprising the steps of:

providing an electrode assembly;

providing a case having an opening and a first position-limiting portion;

providing an end cover;

providing a sealing member;

accommodating the electrode assembly within the case; and covering the opening with the end cover;

wherein in a thickness direction of the end cover, the end cover is located on one side of the first position-limiting portion facing the electrode assembly, and the first position-limiting portion is used for restricting movement of the end cover in a direction away from the electrode assembly;

the end cover and the first position-limiting portion are sealed with the sealing member, so that the end cover and the first position-limiting portion are in sealed connection;

the end cover comprises a cover body and a protrusion protruding from a surface of the cover body facing away from the electrode assembly in the thickness direction of the end cover, and at least part of the sealing member is clamped between the protrusion and the first position-limiting portion;

the first position-limiting portion comprises a first portion and a second portion which are connected, the first portion covers the protrusion, and the second portion extends a first predetermined distance from an end of the first portion near a center of the end cover toward the center of the end cover;

in an unfolded state of the first position-limiting portion, the second portion comprises a plurality of notches spaced around a central axis of the case, and each notch extends to an end of the second portion away from the first portion; and wherein each of the plurality of notches comprises two tangential edges intersecting at a vertex and forming a predetermined angle, and after the first position-limiting portion is folded towards the end cover, the two tangential edges leading from the vertex are butted, so that the second portion forms a complete annular structure.

* * * * *